Oct. 8, 1968  D. F. WOOD  3,405,269

RADIATION PYROMETER HAVING FOCUSING MEANS

Filed July 16, 1965  3 Sheets-Sheet 1

INVENTOR.
DAVID F. WOOD

ATTORNEY.

Oct. 8, 1968  D. F. WOOD  3,405,269
RADIATION PYROMETER HAVING FOCUSING MEANS
Filed July 16, 1965  3 Sheets-Sheet 3
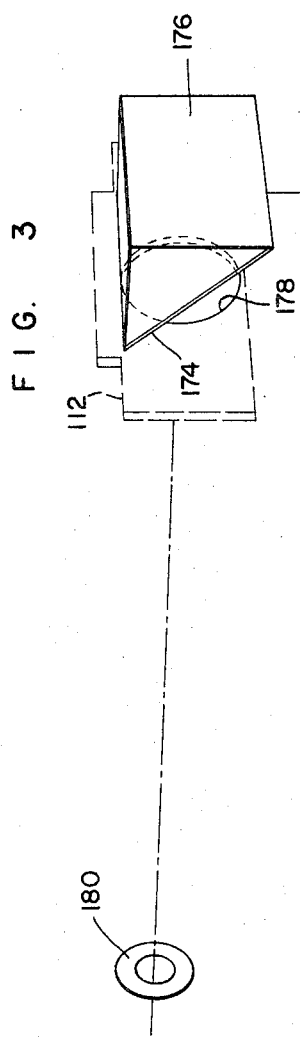
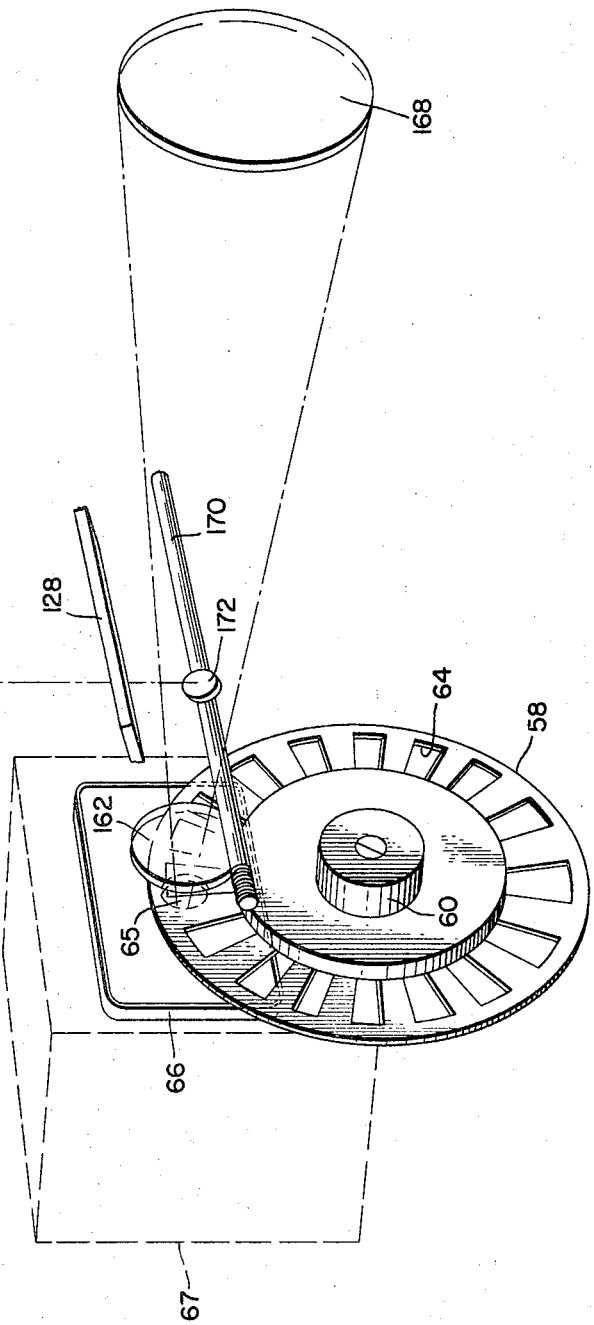
FIG. 3
INVENTOR.
DAVID F. WOOD
BY Arthur H. Swenson
ATTORNEY.

United States Patent Office 3,405,269
Patented Oct. 8, 1968

3,405,269
RADIATION PYROMETER HAVING FOCUSING MEANS
David F. Wood, Roslyn, Pa., assignor to Honeywell Inc., Minneapolis, Minn., a corporation of Delaware
Filed July 16, 1965, Ser. No. 472,645
8 Claims. (Cl. 250—83.3)

ABSTRACT OF THE DISCLOSURE

A radiation pyrometer having a lens for focusing infrared wavelengths upon a sensor is also provided with a mirror for reflecting visible wavelengths into a second path toward a reticle formed on a slide. The slide and lens are simultaneously adjusted while the slide is viewed through a second lens and mirror system. A visual indication of a focused condition on the reticle of the slide automatically indicates a focused condition of the infrared wavelengths upon the sensor.

---

This invention relates to a focusing arrangement for a measuring apparatus and, more specifically, to a device for focusing a first wavelength band from the electromagnetic spectrum on a sensor through the utilization of a second wavelength band which indicates the focused condition of the first band.

The focal length of a single lens element is a function of its refractive index and the refractive index varies depending on the wavelength of the electromagnetic energy passing therethrough. A pyrometer, used for measuring temperatures of relatively small target areas at various focal lengths, must be equipped with suitable directing means to insure that it is sensing the desired target area. The utilization of the visible wavelengths from the electromagnetic energy, radiating from the target area, provides such a means for directing the pyrometer. The pyrometer achieves the measurement of temperature by utilizing the infrared wavelengths from the electromagnetic spectrum. Therefore, the focusing of the visible wavelengths, used for directing the pyrometer, can not be relied on for an indication of a focused condition of the infrared wavelengths on the pyrometer sensor, due to the variation of lens refraction.

Accordingly, one object of the present invention is to provide a measuring device wherein one wavelength band of electromagnetic energy may be focused by focusing a second band of electromagnetic energy.

Another object of the present invention is to provide a means for focusing infrared wavelengths on a pyrometer sensor through the utilization of visible wavelengths.

Still another object of the instant invention is to provide a device for directing a pyrometer toward a target while simultaneously focusing the infrared wavelengths radiating from that target.

A further object of the present invention is to provide a means for focusing a pyrometer wherein it is unnecessary to measure the distance from the object to be scanned to the pyrometer for establishing a proper lens setting and maintain an accurate pyrometer reading.

A still further object of this invention is to provide a high speed, small target pyrometer which may be directly focused on a target.

In accomplishing these and other objects, there is provided a lens for focusing electromagnetic energy upon a sensor. A second focal path is established for focusing visible wavelengths upon a reticle. The lens and reticle are arranged for simultaneous adjustment whereby a visual indication of a focused condition on the reticle automatically indicates a focused condition on the sensor.

Figure 1:
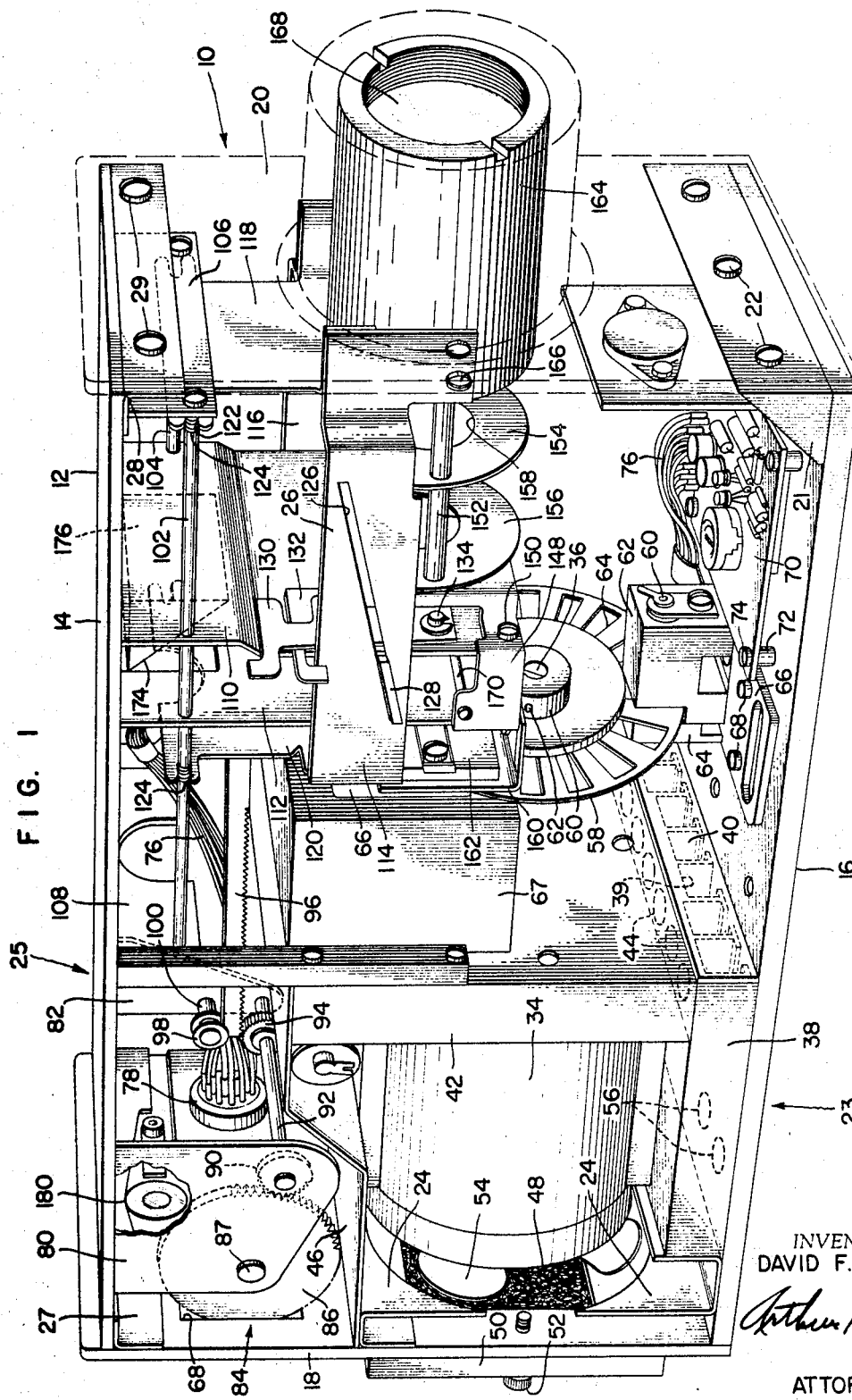
Figure 2:
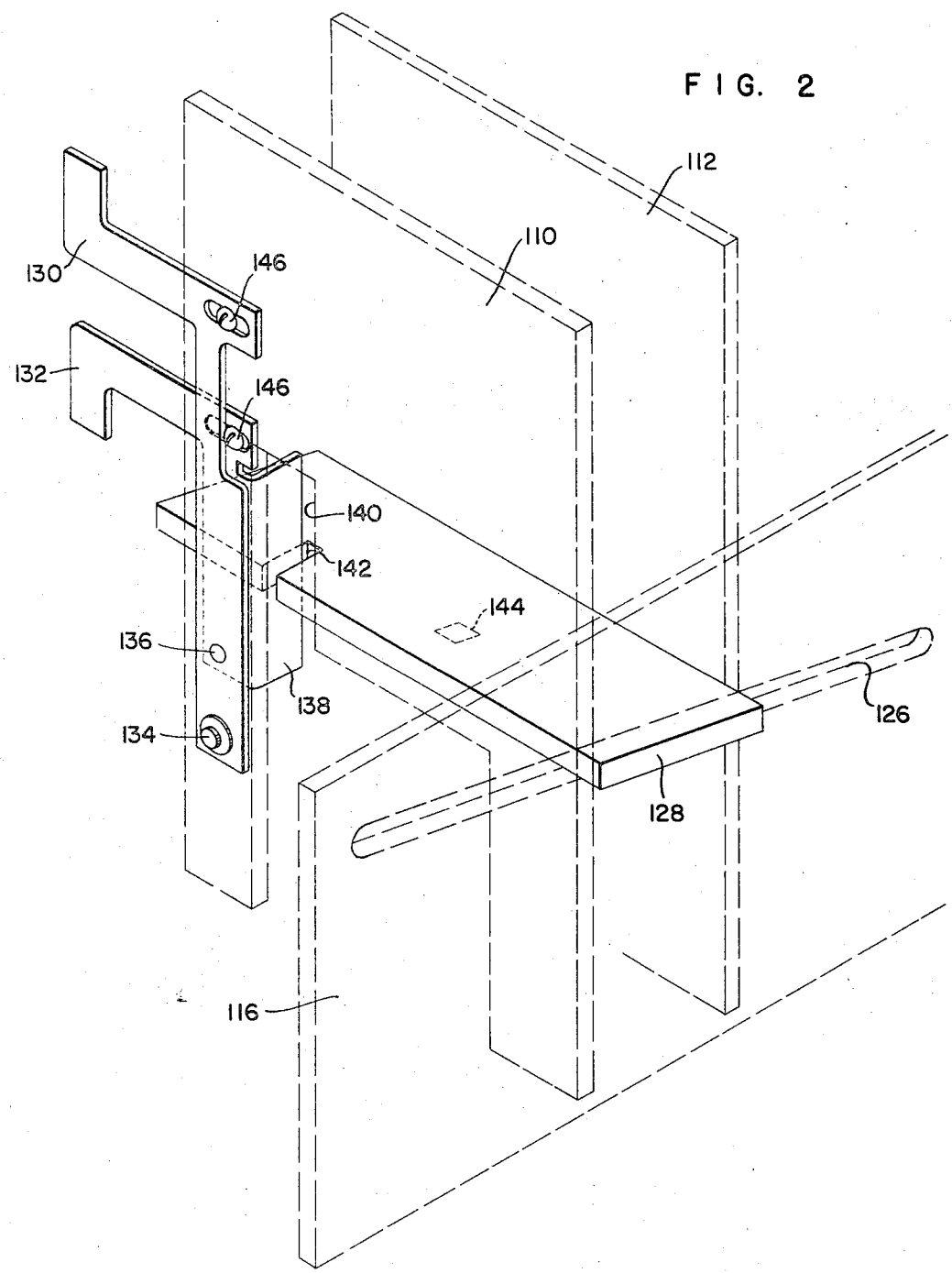

Other objects and many attendant advantages of the present invention will become better understood when considered in connection with the following detailed specification and drawings, wherein FIG. 1 is a perspective view showing a pyrometer embodying the infrared focusing device;

FIG. 2 is a perspective view showing a portion of the focusing device in greater detail; and FIG. 3 is a perspective view showing the parallel focal paths of the present invention.

Referring to FIG. 1, the pyrometer is shown generally at 10 having an outer housing 12 which includes front to back mounting plates 14 and 16, a back panel 18, and a front panel 20. Front panel 20 and mounting plate 16 are attached by a mounting block 21 and a plurality of screws 22. The mounting plate is attached to the back panel 18 by a plurality of screws, not shown, for forming a lower chassis assembly 23. A two piece fan bracket 24 is mounted on the mounting plate 16 and the back panel 18 by suitable means, such as screws. Mounting plate 14 forms an upper chassis assembly 25 which mounts a slideable inner frame 26 and is attached to the lower chassis assembly 24 by angles 27 and 28 and a plurality of screws 29 thereby completing the outer housing 12. The outer housing 12 is generally rectangular having a longitudinal axis through which the slideable inner frame 26 may be adjusted, as described hereinbelow.

A motor 34, equipped with a double ended shaft 36, mounts on an extruded mounting plate 38 having therein a plurality of extended channels 39 arranged in parallel relation with the longitudinal motor axis. The far end of the extruded channels 39 is closed by the fan bracket 24 while the obverse end is closed by a cover plate 40. An air duct housing 42 extends vertically from the upper surface adjacent the obverse end of the channeled mounting plate 38. The duct housing 42 is also channeled with a plurality of channels, not shown, which pass along its major axis perpendicular to the channels 39 and communicate with said channels 39 through a plurality of ports 44. The air duct housing abuts the front surface of the motor 34 and extends above said motor where its channels, not shown, are exposed for communication with the atmosphere surrounding the motor. A closure plate 46 mounts across the full width of the air duct housing 42, for closing the upper ends of the housing channels. Said plate 46 extends back from the duct housing 42 to terminate in a mounting position on the upper surface of the fan bracket 24. A filter 48 is secured to the back panel 18 by a filter cover 50 and screws 52. Mounted on the back extension of the double ended motor shaft 36 is a fan blade 54 for circulating air through the filter 48, along the lower surface of the closure plate 46, into the air duct housing 42, through the channels 39 of the mounting plate 38, and out through a plurality of ports 56 in the surface of mounting plate 16. The cavity formed by the components described hereinabove is closed on each side by a U shaped cover, not shown, which fits over the outer housing 12.

The front extension of the double ended motor shaft 36 passes through the air duct housing 42 for receiving an optical chopper wheel 58 which attaches thereto by means of a collar 60 and set screw 62. The optical chopper wheel 58 has a plurality of radially disposed apertures 64 which intermittently expose a port 65, FIG. 3, in an infrared sensing device 66 to electromagnetic energy. The infrared sensing device may be one of several types, such as a photoelectromagnetic sensor utilizing a magnetic field from a permanent magnet for achieving a high speed target reading. The infrared sensor 66 mounts on a thermoelectric cooler, not shown, which is used in maintaining the sensor at a constant temperature below the maximum ambient temperature of the pyrometer atmosphere, thereby increasing the sensitivity of the sensor. The infrared sensor 66 and the thermoelectric cooler are then encapsulated within an insulating material 67, such as a phenolic plastic which foams in place, to reduce the amount of thermal energy introduced into the sensor. The hot side of the thermoelectric cooler is attached to the obverse surface of the air duct housing 42, which serves as a heat sink as well as a guide for conducting cooling air therethrough. The chopper wheel 58 also interrupts the light from an electric lamp 60 which radiates on a photoelectric cell, not shown. The electric lamp 60 mounts in a mounting block 62 and the photoelectric cell mounts in a corresponding block 64. Both mounting blocks 62 and 64 attach to an adjustable plate 66 which is secured to the mounting plate 16 by screws 68. The remaining electronic components of the pyrometer 10 are mounted on a component mounting board 70 which is held in spaced relationship with the panel 16 by standoffs 72 and secured thereto by a plurality of screws 74. A cable 76 joins the electronic components, on the component board 70, to a power connector 78 located on the back panel 18.

A pair of gear mounting plates 80 and 82 extend downwardly from the lower surface of the mounting plate 14 for supporting a gear train assembly 84. A driving gear 86, mounted on gear mounting plate 80 by a post 87, protrudes through a suitable opening 88 in the back panel 18 for enabling access thereto. The driving gear 86 engages a driven gear 90 which is mounted on a common shaft 92 extending between the mounting plates 80 and 82. A pinion gear 94, mounted on the common shaft 92, engages a rack 96 which is secured against the pinion gear 92 by a rolling guide 98, attached to the plate 82 by a post 100. The rack 96 extends from the slideable inner frame 26, to be described hereinbelow, and transfers a longitudinal motion thereto when a rotary motion is applied to the driving gear 86.

The inner frame 26 slideably mounts on a pair of parallel rods 102 and 104. Said rod ends are supported from the lower surface of mounting plate 14 by end support angles 106 and 108. The center of the rods 102 and 104 are supported by central guide plates 110 and 112, also extending from the lower surface of mounting plate 14. The slideable frame 26 is a four sided rectangular structure having side panels 114 and 116 and supporting end panels 118 and 120 which are T shaped and extend upwardly beyond the side panels. The upper portion of each T shaped end panel is notched at 122, along its outer most edge, for receiving journal bearings 124. Each journal bearing is constructed of a suitable low friction material for allowing a smooth sliding movement over the parallel rods 102 and 104. The rack 96 attaches to the supporting end panel 120 for imparting longitudinal motion to the inner frame 26. A pair of inclined slots 126 traverse the surface of each side panel 114 and 116 at an acute angle to the longitudinal motion of the inner frame 26. A transparent slide 128 mounts within the inclined slots 126 and is retained in a fixed longitudinal position, with respect to the outer housing 12, by the spacing between the central guide plates 110 and 112. Consequently, as the inner frame 26 is slid longitudinally over rods 102 and 104, by the rotary motion of the driving gear 86, the transparent slide 128 moves vertically due to the effect of the inclined slots 126.

The transparent slide 128 is prevented from moving in a lateral direction by adjustable arms 130 and 132, FIG. 2. The first arm 130 pivotally attaches to the central guide plate 110 by a pin 134, while the second arm 132 pivotally attaches to the first arm by a second pin 136. A tab 138 extends through an opening 140, provided for clearance within guide plate 110, and into a slot 142 within the transparent slide 128, thereby providing a positive connection therebetween. The adjustable arms control the lateral position of a reticle 144, which is scribed on the lower surface of the transparent slide 128. After each arm is adjusted, a set of clamping screws 146 are provided for maintaining the arms in their proper location.

The reticle 144 is a tiny geometric figure, such as a square, whose size represents the size of the image appearing on the infrared sensor 66. If the image, viewed on the reticle, does not fill the area enclosed within the reticle further external adjustments should be made for insuring an adequate signal on the infrared sensor 66.

Referring again to FIG. 1, an aperture mounting plate 148, formed into a U shaped section, attaches to the central guide plate 110 by screws 150. A pair of posts 152 extend from the aperture mounting plate, parallel to the longitudinal axis of the outer housing 12, for mounting a pair of toroidally shaped aperture plates 154 and 156 having openings 158 therein. Extending back from the central guide plate 112, an angle 160 mounts a multilayer interference filter 162 which lies along a common longitudinal axis between the aperture openings 158 and the infrared sensor port 65, FIG. 3. Also aligned with the common longitudinal axis is a lens mounting tube 164, attached to the obverse end of the inner frame 26 by a plurality of screws 166. The mounting tube 164 houses a target lens 168 for focusing electromagnetic energy, radiated from a target, on the infrared sensor 66 after it has been focused along a primary focal path through the aperture openings 158 and the filter 162. Extending perpendicularly through the primary focal path is a rod 170 which is threaded at one end for mounting in an internally threaded portion of the U shaped aperture mounting plate 148. Mounted in the center of the rod 170 is a circular mirror 172 for reflecting a portion of the electromagnetic energy from the primary focal path into a secondary path which is focused on the reticle 144.

A second mirror 174 mounts between the central guide plates 110 and 112 on a block 176 which is beveled at approximately 45° for establishing the proper mirror location. A second lens 178, FIG. 3, focuses the image reflected by the second mirror 174, after it has passed through the reticle 144, back to an eye piece 180 which mounts in the back panel 18. After a secondary focal path has been established by the circular mirror 172 the second mirror 174 reflects the secondary path into a parallel relation with the primary focal path.

The operation of the infrared focusing device can best be understood by referring to FIG. 3. Electromagnetic energy from a target area, not shown, is focused by the target lens 168 through the openings 158 in the aperture plates 154 and 156 which serve to limit the field viewed by the infrared sensor 66 to a constant area even though the lens adjustment varies longitudinally along the major axis of the outer housing 12. The aperture plates also serve as antireflection members for limiitng random energy paths. The filter 162, located within the primary focal path between the infrared sensor 66 and the target lens 168, limits the wavelengths of the electromagnetic spectrum passing therethrough to desirable wavelengths within the infrared range. Centered within the primary focal path the circular mirror 172 reflects a portion of the electromagnetic energy from the center of the path onto the reticle 144 scribed in the transparent slide 128. After the electromagnetic energy, focused on the reticle 144, passes beyond the point of focus it is again reflected into a focal path paralleling the primary focal path by a second mirror 174. The visible portion of the electromagnetic spectrum, after reflection from the mirror 174, passes through a second lens 178 which focuses it on the eye piece 180.

The visible portion of the electromagnetic spectrum, which forms an image on the transparent slide 128 when focused thereon, is longitudinally adjusted for location within the reticle 144 by the rotational adjustment of the rod 170. The image is established laterally within the reticle 144 by pivoting the first arm 130 about the pin 134, while the transparent slide 128 is in its lower most position within inclined slot 126. Once the image is centered within the reticle 144, the clamping screw 146 is tightened for locking the arm 130. The transparent slide 128 is then raised to its uppermost position within the inclined slot 126 and the image again centered by pivoting the second arm 132. After locking the second arm 132 with the second clamping screw 146 the centering of the focal image on the reticle 144 is completed throughout its vertical travel.

The pyrometer 10, having had its reticle properly adjusted and fixed into position, is then directed toward a target area by sighting through the eye piece 180, wherein the viewer sees the same image on the reticle 144 that is seen by the infrared sensor. Once the pyrometer is directed toward the desired target area, and locked into position, the adjustment of the infrared focus can be completed. The rotation of the driving gear 86 rotates the pinion 94 for moving the rack 96 and the attached inner frame 26 longitudinally along the rods 102 and 104. The sliding of the inner frame 26 adjusts the target lens 168 with respect to the infrared sensor 66 for focusing infrared wavelengths on that sensor. The differing index of refraction of the infrared and visible wavelengths passing through the target lens 166 makes it necessary for the primary focal path to be adjusted toward a focused condition at a rate proportional to the rate at which the secondary focal path is adjusted. As the inner frame 26 slides in a longitudinal direction the inclined slot 126 forces the transparent slide 128 against the restraint of the central guide supports 110 and 112, thereby causing the slide 128 to move in a vertical direction with relation to said longitudinally sliding inner frame. The vertical motion of the transparent slide 128 provides the proportionate adjustment necessary for utilizing visible wavelengths to focus infrared wavelengths. By observing the point at which the visible wavelengths form a focused image on the reticle 144 the viewer can be assured that target lens 168 is properly adjusted for focusing the infrared wavelengths on the infrared sensor 66.

In this embodiment the second lens 178 is not adjustable. Therefore, it should be noted that a clear image, as seen by the viewer on the reticle 144, will not necessarily denote a focused condition for the infrared wavelengths on the infrared sensor 66. This is caused by the vertical motion of the reticle 144 while the second lens 178 and the eye piece 180 remains fixed. This relationship causes what appears to be a focused condition between the eye piece 180 and the reticle 144 but, under extreme conditions, the image may seem clear while the focus is not optimal. Since it is desirable to adjust the reticle 144 vertically until the visible wavelengths are focused thereon, and since the viewer can not always see a condition of optimum focus, a parallax test must be conducted. The viewer adjusts the reticle until the target area image thereon appears to be in focus, whereupon the viewer moves his point of visual focus to one side. If the reticle 144 and the target, as seen by the viewer, do not move with respect to each other, the pyrometer is focused. However, if the two objects seem to move in relation to each other, the image is actually focused some distance from the reticle and a further adjustment is necessary.

In the present embodiment the second lens 178 is designed with a focal point which will retain a focused image over most of the vertical travel of the reticle 144. It is anticipated by the present invention that the secondary lens 178 can be slideably mounted independent of the inner frame 26 and connected thereto by a suitable gearing arrangement for adjusting the focal length of the secondary focal path. Under this arrangement the focus condition of the infrared wavelengths on the sensor could be determined by a check for image focus on the reticle 144 as well as the parallax check. Further, the eye piece 180 can be permanently attached to the inner frame 26 thereby eliminating the variance of the focal length which now occurs within the secondary focal path.

The driving gear 86 has been calibrated in inches, whereby the distance between the target lens 168 and the target area may be measured and the focus of the pyrometer set directly. This method of focusing the infrared wavelengths on the infrared sensor provides an alternate approach which in some instances may be more convenient than the utilization of the visible wavelengths for focusing the infrared wavelengths. Conversely, the calibrated driving gear 86 may be utilized for determining the distance between the target area and the target lens 168 by reading the distance directly from the calibrated gear after the pyrometer is focused.

Obviously many modifications and variations of the present invention may be made and the device, as described hereinabove, should be considered as an illustration rather than a limitation. Consequently, the subject invention should be limited only by the appendent claims.

What is claimed is:

1. A focusing device comprising
   lens means for focusing externally radiated electromagnetic energy into a primary focal path,
   sensor means for receiving said electromagnetic energy including a first wavelength band,
   means for reflecting said electromagnetic energy including a second wave-length band from said primary focal path,
   reticle means on which said reflected second wavelength band of electromagnetic energy is focused,
   means for scanning said reticle means, and
   adjustable means for adjusting said lens means to focus said externally radiated energy on said sensor means and for simultaneously adjusting said reticle means until an indication of focus of said second wavelength band of electromagnetic energy on said reticle means, through said scanning means, indicates a focused condition of said first wavelength band of electromagnetic energy on said sensor means.

2. A focusing device comprising
   lens means for focusing externally radiated electromagnetic energy into a primary focal path,
   sensor means for receiving said electromagnetic energy including a first wavelength band,
   means for reflecting a portion of said electromagnetic energy from said primary focal path,
   reticle means on which said reflected electromagnetic energy is focused,
   means for viewing said reticle means, and
   adjustable means for adjusting said lens means to focus said externally radiated energy on said sensor means and for simultaneously adjusting said reticle means until a visual indication of focus on said reticle means, through said viewing means, indicates a focused condition of said first wavelength band of electromagnetic energy on said sensor means.

3. A focusing device for a radiation pyrometer comprising
   lens means for focusing externally radiated electromagnetic energy including infrared wavelength components into a primary focal path,
   sensor means for receiving said focused electromagnetic energy including said infrared wavelength components,
   means for reflecting a portion of said electromagnetic energy including visual wavelength components from said primary focal path,
   reticle means on which said reflected visual wavelength components of said electromagnetic energy are focused,
   means for viewing said reticle means, and
   adjustable means for adjusting said lens means to focus said infrared wavelength components of said externally radiated energy on said sensor means and simultaneously for adjusting said reticle means until a visual indication of focus on said reticle means, through said viewing means, indicates a focused condition of said infrared wavelength components on said sensor means.

4. An infrared focusing device for a radiation pyrometer comprising an adjustable lens means for focusing externally radiated electromagnetic energy including infrared wavelength components into a primary focal path, filtering means through which said electromagnetic energy is focused, an infrared sensor for receiving said filtered energy, a mirror disposed within said primary focal path of said electromagnetic energy for reflecting a portion thereof, adjustable reticle means on which said reflected electromagnetic energy is focused, means for viewing said electromagnetic energy focused on said adjstable reticle means, and adjustable means for adjusting said lens means to focus said externally radiated energy on said infrared sensor and for simultaneously adjusting said reticle means until a visual indication of focus on said reticle means, through said viewing means, indicates a focused condition of said infrared wavelength components on said infrared sensor.

5. An infrared focusing device for a radiation pyrometer comprising a housing, a longitudinally slideable frame mounted within said housing, lens means attached to said slideable frame for focusing externally radiated electromagnetic energy including infrared components into a primary focal path, an infrared sensor for receiving said focused electromagnetic energy, a mirror disposed within the primary focal path of said electromagnetic energy for reflecting a portion thereof, reticle means mounted within said slideable frame on which said reflected electromagnetic energy is focused, means for viewing said electromagnetic energy focused on said reticle means, and means for longitudinally adjusting said slideable frame thereby adjusting said lens means in a longitudinal direction for focusing said externally radiated energy on said infrared sensor and simultaneously for adjusting said reticle means in a vertical direction, whereby a visual indication of focus on said reticle means, through said viewing means, indicates a focused condition of said infrared wavelength components on said infrared sensor.

6. An infrared focusing device for a radiation pyrometer comprising an outer housing, a longitudinally slideable inner frame mounted within said housing and having inclined slots therein, lens means attached to said slideable frame for focusing externally radiated electromagnetic energy including infrared wavelength components into a primary focal path, an infrared sensor for receiving said focused electromagnetic energy, a mirror disposed within the primary focal path of said electromagnetic energy for reflecting a portion thereof, reticle means slideably mounted within said inclined slots on which said reflected electromagnetic energy is focused, means for viewing said electromagnetic energy focused on said reticle means, and means for longitudinally adjusting said slideable frame thereby adjusting said lens means in a longitudinal direction for focusing said externally radiated energy on said infrared sensor and simultaneously for adjusting said reticle means vertically within said inclined slots, whereby a visual indication of focus on said reticle means, through said viewing means, indicates a focused condition of infrared wavelength components on said infrared sensor.

7. An infrared focusing device as described in claim 6, wherein said means for longitudinally adjusting said slideable frame includes a gear train calibrated in units for directly indicating the distance between said lens means and the source of said externally radiated electromagnetic energy.

8. An infrared focusing device for a radiation pyrometer comprising an outer housing having a longitudinal axis, an inner frame slideably mounted within said outer housing for motion along said longitudinal axis and having slots therein, inclined at an acute angle to said longitudinal axis, lens means attached to said slideable frame for focusing externally radiated electromagnetic energy including infrared wavelength components into a primary focal path, filtering means through which said electromagnetic energy is focused for the removal of unwanted wavelengths, an infrared sensor for receiving said filtered energy, a mirror disposed within the primary focal path of said electromagnetic energy for reflecting a portion thereof, reticle means slideably mounted within said inclined slots on which said reflected electromagnetic energy is focused, means for viewing said electromagnetic energy focused on said reticle means including a second mirror for returning said electromagnetic energy to a focal path paralleling said primary focal path and a second lens for focusing said energy on an eye piece mounted within said outer housing, and a gear train connecting said outer housing to said inner frame for adjusting the longitudinal position of said inner frame within said outer housing thereby adjusting said lens means in a longitudinal direction for focusing said externally radiated energy on said infrared sensor and simultaneously for adjusting said reticle means vertically within said inclined slots, whereby a visual indication of focus on said reticle means, through said viewing means, indicates a focused condition of infrared wavelength components on said infrared sensor.

References Cited
UNITED STATES PATENTS

| | | | |
|---|---|---|---|
| 2,798,962 | 7/1957 | Wormser | 73—355 |
| 2,976,730 | 3/1961 | Howell | 88—22.5 X |
| 3,117,024 | 1/1964 | Ross | 88—22.5 X |
| 3,187,574 | 6/1965 | Mason et al. | 73—355 |

RALPH G. NILSON, *Primary Examiner.*

S. ELBAUM, *Assistant Examiner.*